(12) United States Patent
Yoshimura et al.

(10) Patent No.: US 6,570,558 B2
(45) Date of Patent: *May 27, 2003

(54) COORDINATES INPUT APPARATUS WITH A PLATE MEMBER SEPARATED BY A GAP FROM A VIBRATION TRANSMISSION PLATE

(75) Inventors: Yuichiro Yoshimura, Kamakura (JP); Atsushi Tanaka, Yamato (JP); Ryozo Yanagisawa, Inzai (JP); Katsuyuki Kobayashi, Yokohama (JP); Masaki Tokioka, Fujisawa (JP); Hajime Sato, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/775,201

(22) Filed: Dec. 30, 1996

(65) Prior Publication Data

US 2001/0033272 A1 Oct. 25, 2001

(30) Foreign Application Priority Data

Jan. 10, 1996 (JP) .............................. 8-001975

(51) Int. Cl.[7] .......................... G09G 5/00; G08C 21/00
(52) U.S. Cl. ................ 345/177; 178/18.01; 178/18.03; 178/18.04
(58) Field of Search ............................... 345/173, 175, 345/176, 177, 179; 178/18.01, 18.03, 18.04, 19.01, 19.02, 19.04

(56) References Cited

U.S. PATENT DOCUMENTS

| | | | | |
|---|---|---|---|---|
| 4,897,510 A | * | 1/1990 | Tanaka et al. | 178/18 |
| 4,980,518 A | * | 12/1990 | Kobayashi | 178/18 |
| 5,438,872 A | | 8/1995 | Kobayashi et al. | 73/597 |
| 5,486,967 A | * | 1/1996 | Yanagisawa | 345/177 |
| 5,491,305 A | | 2/1996 | Kawakami et al. | 178/19 |
| 5,760,346 A | * | 6/1998 | Kobayashi | 345/177 |

FOREIGN PATENT DOCUMENTS

JP        63-245711        10/1988

\* cited by examiner

*Primary Examiner*—Vijay Shankar
(74) *Attorney, Agent, or Firm*—Fitzpatrick, Cella, Harper & Scinto

(57) ABSTRACT

An influence by a vibration which is transmitted in the air is reduced, thereby preventing an erroneous detection of coordinates or a deterioration in a detecting precision. An elastic resin sheet is arranged on a coordinates input surface side of a vibration transmission plate so as to have a gap between the resin sheet and the vibration transmission plate and is fixed by an adhesive layer. When coordinates are inputted by a vibrator pen, namely, when a vibration is inputted, the resin sheet is warped by a writing pressure of the vibrator pen and the resin sheet comes into contact with the vibration transmission plate. Therefore, the vibration applied by the vibrator pen is efficiently transmitted to the vibration transmission plate. On the other hand, a vibration transmitted from the air is reflected by the boundary on both surface sides of the resin sheet and by the surface of the vibration transmission plate by a difference between acoustic impedances, so that the vibration entering the vibration transmission plate is remarkably reduced.

14 Claims, 11 Drawing Sheets

COORDINATES INPUT APPARATUS WITH A PLATE MEMBER SEPARATED BY A GAP FROM A VIBRATION TRANSMISSION PLATE

BACKGROUND OF THE INVENTION

1. Field of the Invention

The invention relate s to a coordinates input apparatus and, more particularly, to a coordinates input apparatus for applying a vibration to a vibration transmission plate, detecting a vibration to be transmitted by a plurality of vibration sensors arranged for the vibration transmission plate, and deriving input coordinates of the vibration on the basis of transmission times of the vibration.

2. Related Background Art

Hitherto, there has been known a coordinates input apparatus for inputting a vibration to a vibration transmission plate by a vibrator pen having therein a piezoelectric device or the like, detecting the vibration by a plurality of vibration sensors provided for the vibration transmission plate, and detecting coordinates of an input point.

In such a kind of coordinates input apparatus, a plate-shaped member of an elastic material such as glass, aluminum, or the like or a construction in which a resin sheet is laminated on the surface of a plate-shaped member as disclosed in JP-A-63-245711 is used as a vibration transmission plate.

In the above conventional apparatus, however, a sound wave having a large sound pressure among sound waves which are transmitted in the air gives a vibration to the vibration transmission plate, such a vibration is detected by the vibration sensor as noise together with the vibration inputted from the vibrator pen and it becomes a cause of occurrence of errors in a calculation result of the coordinates.

FIG. 15 is a cross sectional view showing a construction of a conventional coordinates input apparatus. As shown by an arrow of a bold line in the diagram, a vibration from a vibrator pen is transmitted in a vibration transmission plate and is detected by vibration sensors. There is, however, a case where a vibration generated from a sound source other than the vibrator pen is also transmitted in the air and enters the vibration transmission plate. The vibration which is transmitted in the air and is inputted is hereinafter also referred to as an "aerial transmitted vibration".

The input of the vibration to the vibration transmission plate by the vibrator pen is executed by making a pen tip of the vibrator pen come into contact with the vibration transmission plate. In this case, since the vibration is transmitted from a solid to another solid, a matching performance of an acoustic impedance is good and an incident efficiency of the vibration is high. When the aerial transmitted vibration enters the vibration transmission plate, on the other hand, since the vibration is transmitted from gas to a solid, a matching performance of the acoustic impedance is bad and most of the vibration is reflected and an incident efficiency is low. Thus, an influence of noise with respect to the vibration of a low sound pressure is small.

As for the aerial transmitted vibration such as a voice of a person whose sound pressure is relatively low or the like, however, although an influence as noise is small, with respect to the aerial transmitted vibration of a mechanical sound, a burst sound, or the like in which a sound pressure is relatively high, an influence as noise is large and it becomes a cause of deterioration in calculating precision of coordinates.

In the conventional coordinates input apparatus, the vibrator pen is driven at a predetermined period and a transmission time of the vibration from the vibrator pen to each vibration sensor, namely, a vibration transmission time is measured. Therefore, when the aerial transmitted vibration of a high sound pressure is intermittent, so long as it differs from a timing when the vibration by the vibrator pen is detected at each vibration sensor, no influence is exerted on the detecting precision of the coordinates. However, when the vibration of a high sound pressure is continuously generated, an erroneous detection of the coordinates or a deterioration of the calculating precision occurs.

As a countermeasure for the aerial transmitted vibration, it is easily considered to provide a filter circuit for removing a frequency band of the aerial transmitted vibration which is detected by the vibration sensor. However, when the frequency band of the aerial transmitted vibration serving as a noise source is a wide band, a case where the frequency band of the vibration which is generated by the vibrator pen is included in the frequency band is presumed. A case where the frequency band of the aerial transmitted vibration is the same as the frequency band of the vibration that is generated by the vibrator pen is also presumed. Therefore, some of the filter circuits cannot remove the influence by the aerial transmitted vibration of the same frequency band as that of the vibration that is generated by the vibrator pen and cannot be regarded as effective means.

Although the construction such that the resin sheet or the like is adhered to the whole surface of the vibration transmission plate is effective with respect to the feeling of writing, a protection of the surface of the vibration transmission plate, a prevention of the reflection of the light, and a prevention of scattering when the vibration transmission plate is broken, it is not an effective countermeasure for the aerial transmitted vibration. This is because, for example, when the resin sheet is adhered to the surface of the vibration transmission plate, the resin sheet and the vibration transmission plate are acoustically adhered between solids by an adhesive layer, a matching performance of the acoustic impedance is good, and the aerial transmitted vibration which arrived at the resin sheet is easily propagated to the vibration transmission plate.

SUMMARY OF THE INVENTION

According to a preferred embodiment of the invention, it is an object to provide a coordinates input apparatus for applying a vibration to a vibration transmission plate by vibration input means, detecting the vibration to be transmitted by a plurality of vibration sensors arranged for the vibration transmission plate, and deriving input coordinates of the vibration on the basis of a transmission time of the vibration, comprising: a plate member having elasticity; and instructing means for instructing the plate member by providing a gap between the plate member and the vibration transmission plate.

The above and other objects and features of the present invention will become apparent from the following detailed description and the appended claims with reference to the accompanying drawings.

BRIEF DESCRIPTION OF THE DRAWINGS

FIGS. 8, 8A and 8B are cross sectional views for explaining a construction of the coordinates input portion according to the embodiment and its function;

DETAILED DESCRIPTION OF THE PREFERRED EMBODIMENTS

Figure 1:
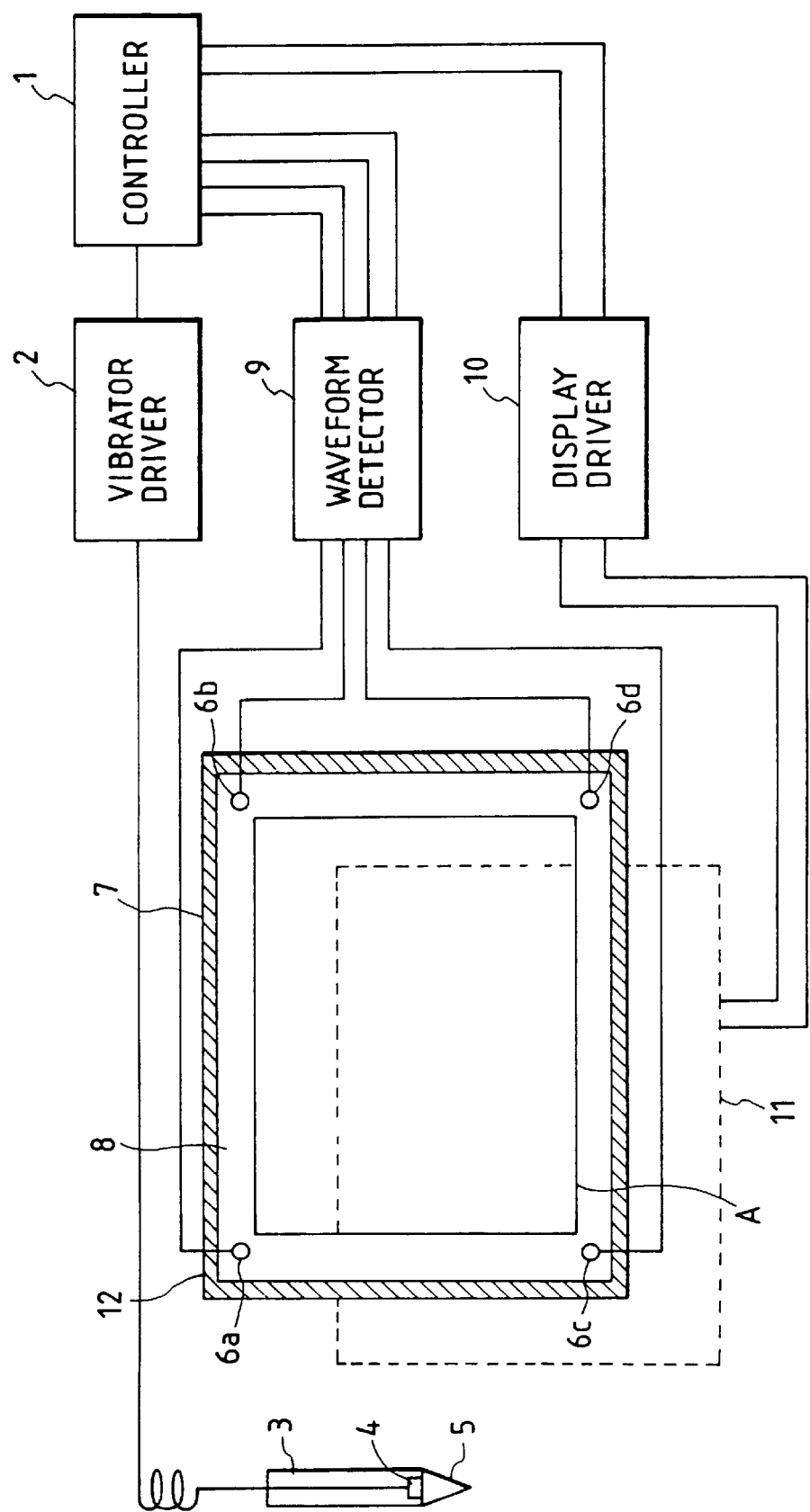
FIG. 1 is a cross sectional view showing a construction of a coordinates input portion according to the first application example.
Figure 2:
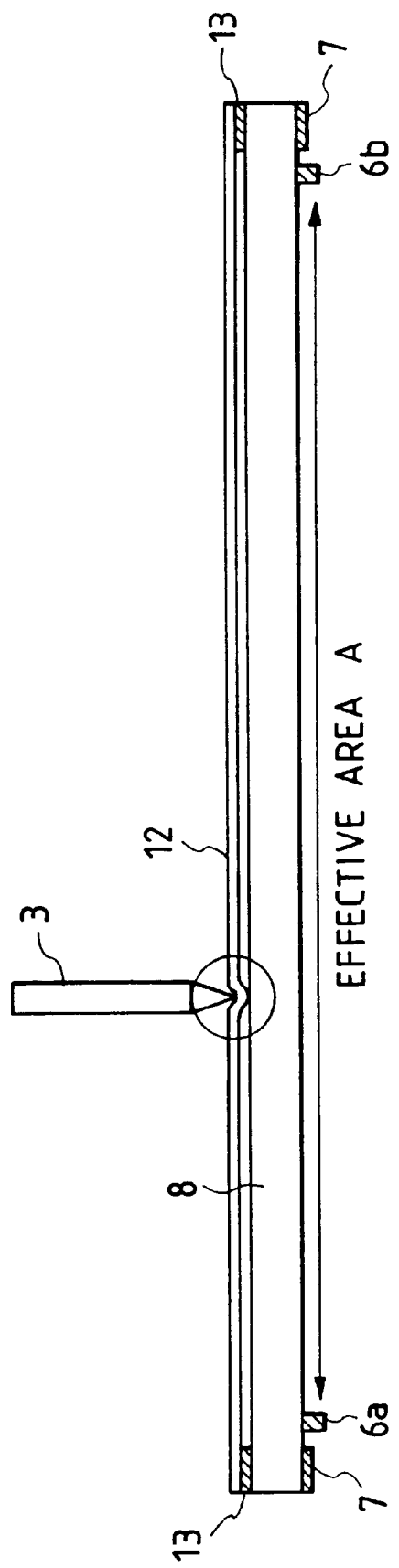
FIG. 2 is a schematic cross sectional view of a coordinates input portion of a coordinates input apparatus according to an embodiment.
Figure 3:
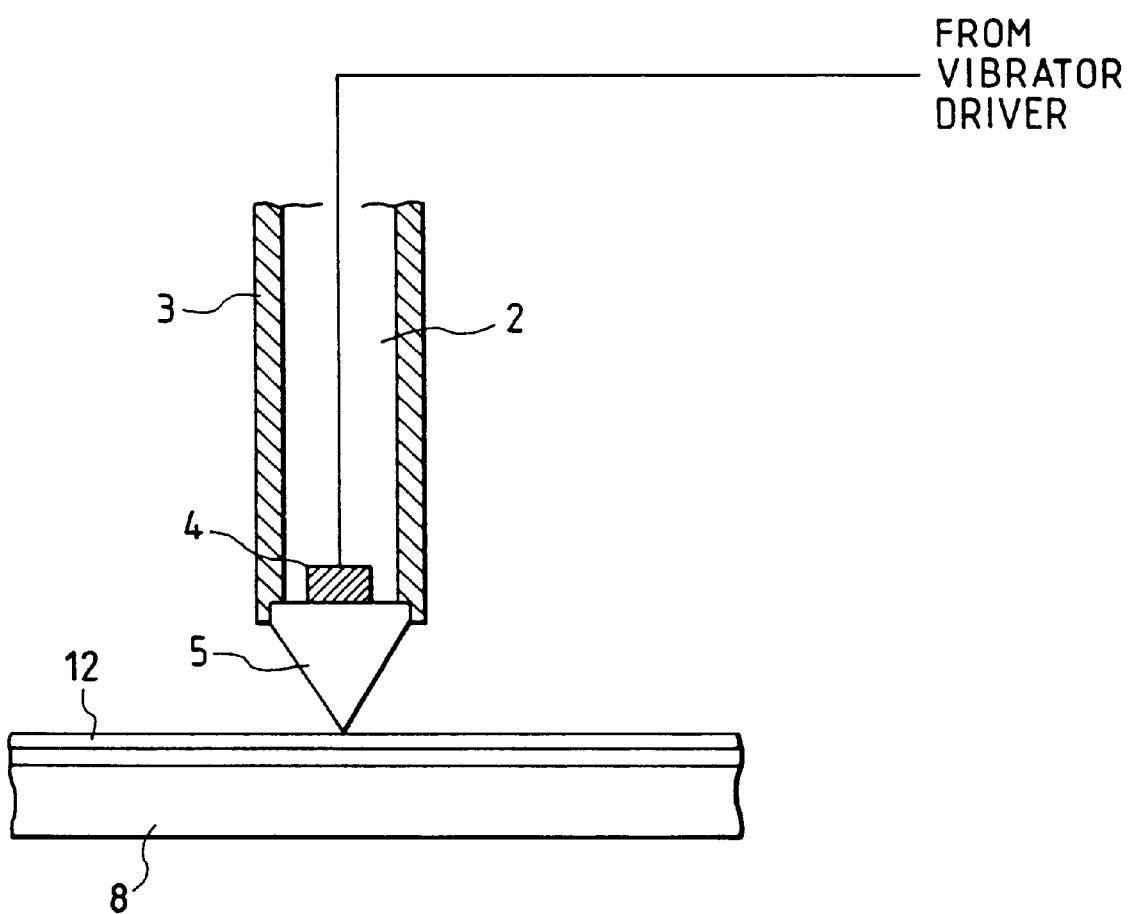
FIG. 3 is a cross sectional view showing a state in which a vibrator pen is in contact with the coordinates input portion.

A preferred embodiment of the invention will now be described hereinbelow with reference to the drawings. FIG. 1 is a diagram showing a whole construction of a coordinates input apparatus according to an embodiment of the invention. FIG. 2 is a schematic cross sectional view of a coordinates input portion of the coordinates input apparatus according to the embodiment.

In the diagram, reference numeral 1 denotes a controller for controlling the whole apparatus and calculating input coordinates; 2 a vibrator driver for making a pen tip 5 vibrate by supplying a drive signal to a vibrator 4 of a vibrator pen 3; and 8 a vibration transmission plate made of a transparent material such as acrylic, glass, or the like. An input of coordinates can be performed by making the vibrator pen 3 come into contact with a resin sheet 12 arranged over the vibration transmission plate 8 so as to overlap with a gap. When a vibration is actually inputted, the vibrator pen 3 is come into contact with a desired position in an effective area A.

A damping material 7 to suppress the return of a reflected vibration to a center portion is provided around an outer periphery of the vibration transmission plate 8. Four vibration sensors 6a to 6d such as piezoelectric devices or the like each for converting a mechanical vibration into an electric signal are fixedly arranged at corner positions of a peripheral portion of the vibration transmission plate 8. A vibration sensor 6 inclusively expresses the vibration sensors 6a to 6d hereinbelow.

An output signal from each vibration sensor 6 is sent to a pre-amplifier (not shown) provided near each vibration sensor 6 and is amplified at a predetermined gain by the pre-amplifier. The amplified output signal is supplied to a waveform detector 9. Further, a detection signal of the vibration which is formed by the waveform detector 9 in correspondence to each vibration sensor 6 is sent to the controller 1. While driving the vibrator 4 at a predetermined period through the vibrator driver 2, the controller 1 measures a time (namely, vibration transmission time) from a timing when the vibrator 4 was driven to a timing until the detection signal is received from the waveform detector 9, obtains a distance from the position where the vibrator pen 3 is come into contact with the vibration transmission plate 8 to each vibration sensor 6, and calculates input coordinates from the distances derived.

Reference numeral 11 denotes a display which is constructed by a liquid crystal display, a CRT, their projection type displays, or the like and is arranged behind the vibration transmission plate 8 and can display on a dot unit basis. The display 11 is driven by a display driver 10 and displays, for example, a position drawn by the vibrator pen 3. The user can see the display through the vibration transmission plate 8 and resin sheet 12.

Reference numeral 12 denotes a transparent resin sheet which is overlappingly arranged over the vibration transmission plate 8 so as to overlap with a gap. As shown in the cross sectional view of FIG. 2, the resin sheet 12 is fixed to the vibration transmission plate 8 by an adhesive layer 13 and a gap corresponding to a thickness of the adhesive layer 13 is formed between the resin sheet 12 and the vibration transmission plate 8. It is desirable that the position of the adhesive layer 13 is on the outside of the effective area A. It is more preferable that it is on the outside of the fixing position of each vibration sensor 6 as shown in the diagram.

The vibrator 4 built in the vibrator pen 3 is driven by the vibrator driver 2. The drive signal of the vibrator 4 is formed by amplifying a pulse signal at a low level that is supplied from the controller 1 at a predetermined gain in the vibrator driver 2. The electric drive signal is converted into a mechanical ultrasonic vibration by the vibrator 4 and is transmitted to the vibration transmission plate 8 through the pen tip 5.

As an oscillating frequency of the vibrator 4, a value such that a plate wave can be generated in the vibration transmission plate 8 such as a glass or the like is selected. To drive the vibrator 4, a mode such that a vibration is generated in the vertical direction for the vibration transmission plate 8 is selected. Further, by setting the oscillating frequency of the vibrator 4 to a resonance frequency of a vibration transmission member including the pen tip 5, an efficient vibration conversion can be performed.

Since an elastic wave which is propagated in the vibration transmission plate 8 is a plate wave as mentioned above, as compared with a surface wave, the elastic wave has an advantage such that it is hard to be influenced by a scratch, an obstacle, or the like on the surface of the vibration transmission plate.

A detailed constructional example of each portion will now be described hereinbelow.

<Constructional Example of Controller>

The controller 1 generates the drive signal to drive the vibrator 4 in the vibrator pen 3 at a predetermined period (for example, 5 msec) through the vibrator driver 2 and activates a counter at a timing when the drive signal is supplied, thereby starting a time counting operation. The vibration generated by the vibrator pen 3 is delayed in accordance with transmission distances and reach each vibration sensor 6.

The waveform detector 9 detects each signal from each vibration sensor 6, forms a detection signal indicating that the vibration has reached each vibration sensor 6, and supplies to the controller 1. The controller 1 receives the detection signal corresponding to each vibration sensor 6, recognizes a vibration transmission time regarding each vibration sensor 6 from a count value of the counter at an arrival timing of the vibration shown by each detection signal, and calculates a vibration transmission distance to each vibration sensor 6 on the basis of the vibration transmission time, thereby calculating the input coordinates of the vibration by the vibrator pen 3.

On the basis of the calculated input coordinates, the controller 1 drives, for example, the display driver 10 so as to display, for instance, the input coordinates or the like or outputs the coordinates to an external equipment by a serial or parallel communication or the like.

Figure 4:
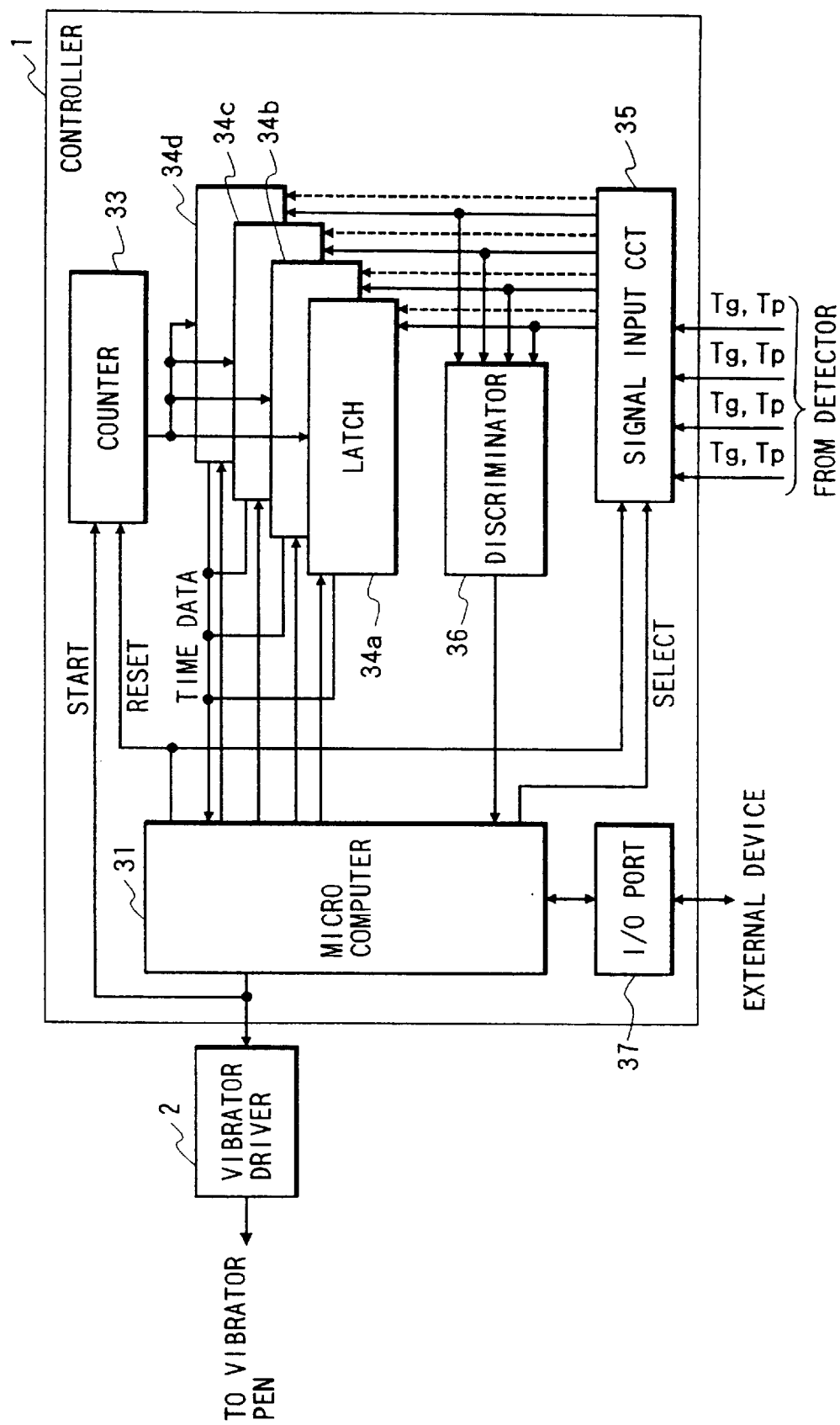
FIG. 4 is a block diagram showing a constructional example of a controller.

FIG. 4 is a block diagram showing a constructional example of the controller 1. In the diagram, reference numeral 31 denotes a micro computer for controlling the controller 1 (whole coordinates input apparatus). The micro computer 31 has: a non-volatile memory in which program codes indicative of an operating procedure and various constants (including a vibration transmission speed) have been stored; a work memory which is used for a calculation or the like; a CPU for executing an arithmetic operation and a control by using those memories; and the like.

Reference numeral 33 denotes a counter for performing a time counting operation on the basis of a reference clock signal (not shown). The counter 33 is activated by the drive signal (start signal) to drive the vibrator 4 through the vibrator driver 2 and starts the time counting operation. After the vibration transmission time regarding each vibration sensor 6 was measured, the counter 33 is initialized by a reset signal. Thus, the start timing of the counting operation and the detection timing of the vibration by each vibration sensor 6 (waveform detector 9) are synchronized. A delay time (namely, vibration transmission time) from a timing of the generation of the vibration to a timing until the vibration is detected by each vibration sensor 6 can be measured.

The detection signal (timing signal) regarding each vibration sensor 6 which is supplied from the waveform detector 9 is inputted to latches 34a to 34d through a signal input circuit 35. As detection signals, there are two kinds of signals of a Tp signal and a Tg signal as will be explained hereinlater. They are switched by a selection signal and a phase delay time and a group delay time based on each signal are measured.

The latches 34a to 34d correspond to the vibration sensors 6a to 6d. When the detection signal is received from the corresponding vibration sensor 6, each latch latches the count value of the counter 33 at that time. When it is discriminated that all of the detection signals about the vibration sensors 6 have been received, a discriminator 36 generates a reception completion signal indicative of such a fact to the micro computer 31. When the reception completion signal is received from the discriminator 36, the micro computer 31 reads the vibration arrival time to each vibration sensor 6 from each of the latches 34a to 34d and executes predetermined calculations, thereby calculating the coordinates of the vibrator pen 3 on the vibration transmission plate 8.

The calculated coordinates are outputted to the display driver 10 through an I/O port 37. For example, a dot or the like can be displayed at the corresponding position (coordinates) on the display 11. The calculated coordinates can be also supplied to an interface circuit (not shown) through the I/O port 37 and provided for an external equipment.

<Calculation Example of Vibration Transmission Distance>

First, a principle of obtaining the vibration transmission distance from the vibrator pen 3 to each vibration sensor 6 will be described. As for the measurement of the vibration transmission time, the CPU in the micro computer 31 reads the program codes stored in the non-volatile memory and executes the measurement on the basis of the program codes.

Figure 5:
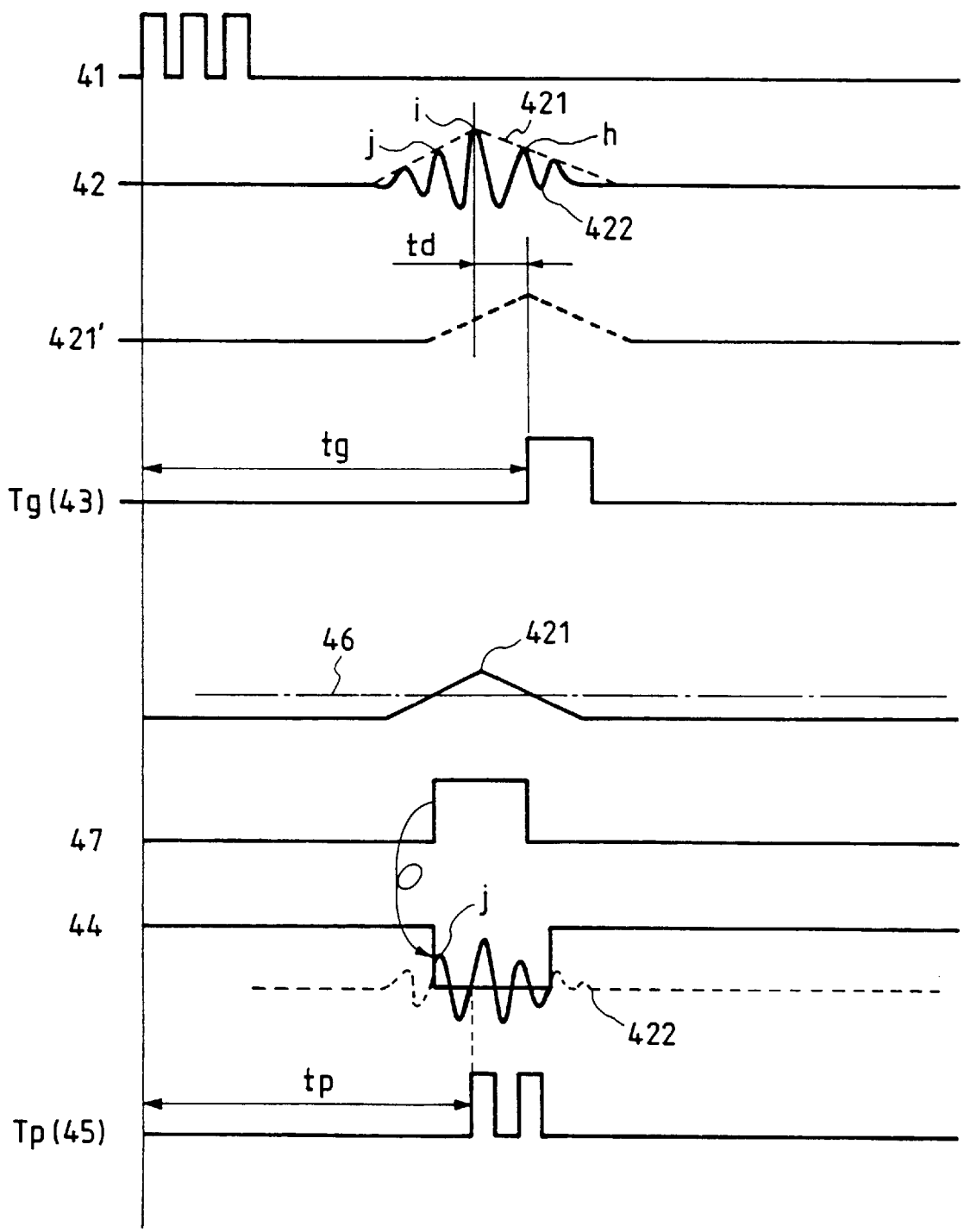
FIG. 5 is a diagram for explaining signals which are inputted to a signal waveform detector and a principle of a measurement of vibration transmission times based on those signals.

FIG. 5 is a diagram for explaining signals which are inputted to the waveform detector 9 and a principle of a measurement of the vibration transmission time based on the signals.

The measurement of the vibration transmission time from the vibrator pen 3 to each vibration sensor 6 is started simultaneously with an output of the drive signal (start signal) to the vibrator driver 2 as mentioned above. In this instance, the vibrator driver 2 supplies a drive signal 41 to the vibrator 4. The ultrasonic vibration which had been generated on the basis of the drive signal 41 and was transmitted from the vibrator pen 3 to the vibration transmission plate 8 progresses with a time tg according to the distance to each vibration sensor 6. After that, it is detected by each vibration sensor 6. A signal 42 shown in the diagram indicates an example of the signal waveform detected by the vibration sensor 6.

In the embodiment, since the plate wave is used, a relation between an envelope 421 and a phase 422 of the detected waveform changes in accordance with the vibration transmission distance in the vibration transmission plate 8. It is now assumed that a progressing velocity of the envelope 421, namely, a group velocity is set to Vg and a progressing velocity of the phase 422, namely, a phase velocity is set to Vp. A principle of detecting the distance between the vibrator pen 3 and each vibration sensor 6 from the group velocity Vg and phase velocity Vp will now be described.

First, attention is paid to only the envelope 421. The velocity is equal to Vg. When a certain point on a specific waveform, for example, an inflection point or peak point (refer to signals 42 and 43) is detected, the distance between the vibrator pen 3 and each vibration sensor 6 is given by the following equation (1).

$$d = Vg \cdot tg \quad (1)$$

where, tg: vibration transmission time (group delay time).

Further, in order to determine the coordinates at a higher precision, a process based on the detection of the phase signal is executed. A time (phase delay time) at a specific detection point of the phase signal 422, for example, from the input of the vibration to a zero-cross point after the signal exceeded a predetermined signal level 46 assumes tp (which is obtained from a signal 45 that is derived by forming a window signal 44 of a predetermined width for a signal 47 and comparing with the phase signal 422). The distance between the vibrator pen 3 and each vibration sensor 6 is obtained by the following equation (2).

$$d = n \cdot \lambda p + Vp \cdot tp \quad (2)$$

where, $\lambda p$: wavelength of elastic wave
n: integer.

From the equations (1) and (2), integer n is given by the following equation (3).

$$n = [(Vg \cdot tg - Vp \cdot tp)/\lambda p + 1/N] \quad (3)$$

where, N: real number other than 0 and a proper value is used.

For instance, assuming that N=2, so long as a fluctuation such as tg or the like within a ±½ wavelength, n can be determined. By substituting a value of n obtained as mentioned above into the equation (2), the distance between the vibrator pen 3 and each vibration sensor 6 can be accurately measured.

A detection signal Tg indicative of the group delay time tg and a detection signal Tp indicative of the phase delay time tp are formed by the waveform detector 9 and supplied to the controller 1.

Figure 6:
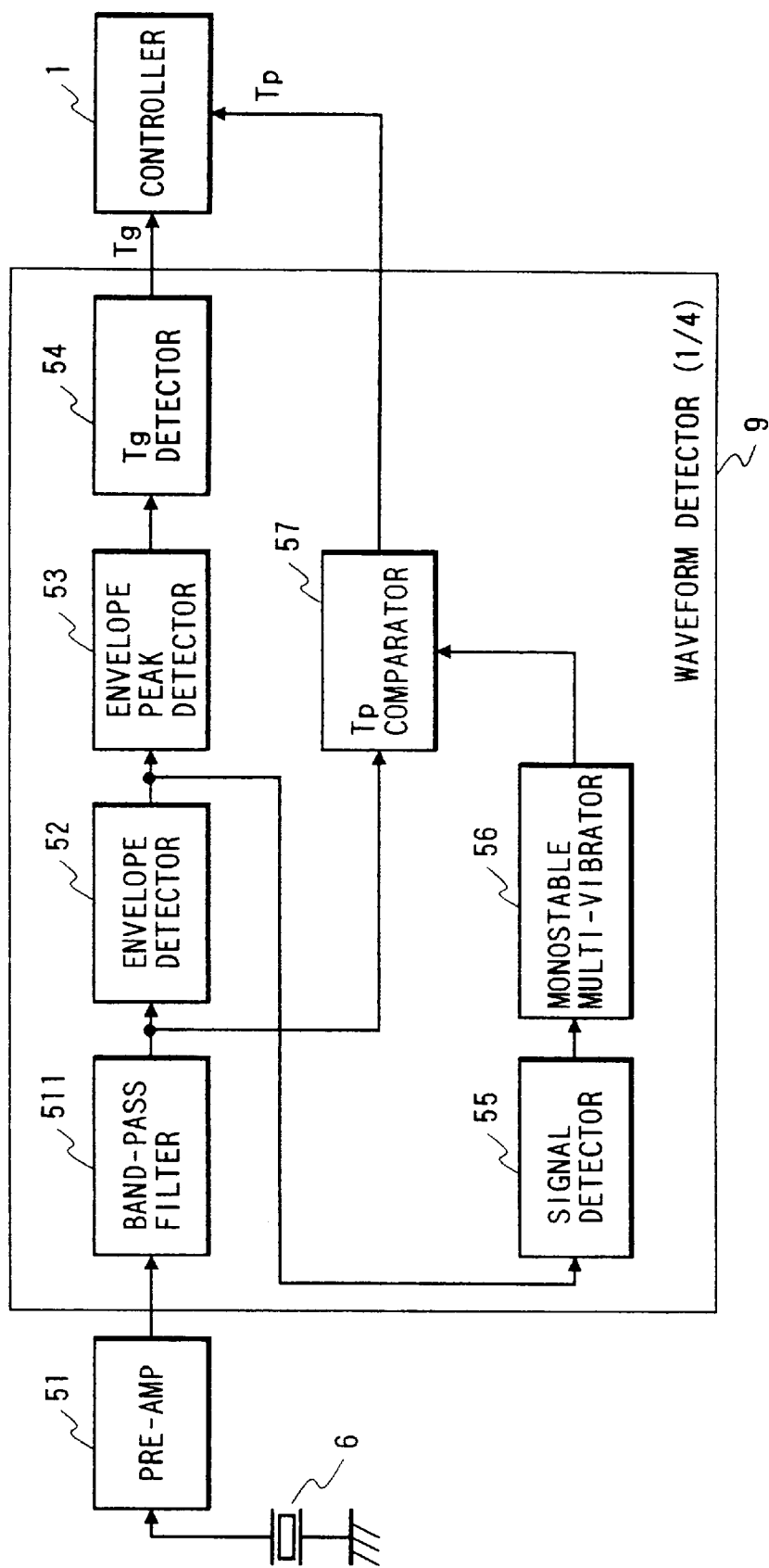
FIG. 6 is a block diagram showing a constructional example of a part of the signal waveform detector.

FIG. 6 is a block diagram showing a constructional example of a part of the waveform detector 9. The construction shown in FIG. 6 corresponds to one of the vibration sensors 6. Actually, the waveform detector has four sets of constructions in correspondence to the vibration sensors 6.

In the diagram, the output signal of the vibration sensor 6 is amplified at a predetermined gain by a pre-amplifier 51 arranged near the sensor. The amplified signal is supplied to a band-pass filter 511, by which surplus frequency components are removed (refer to the signal 42). The resultant signal is inputted to an envelope detector 52 constructed by, for example, an absolute value circuit, a low-pass filter, and the like and only the envelope (refer to the signal 421) is extracted. A timing of a peak of the envelope is detected by an envelope peak detector 53. A signal indicative of the timing of the peak of the detected envelope is supplied to a Tg detector 54 constructed by a monostable multi-vibrator or the like. A detection signal Tg (refer to the signal Tg) as a signal indicative of the detection of the delay time of the envelope is formed and supplied to the controller 1.

On the other hand, the envelope (refer to the signal 421) detected by the envelope detector 52 forms a pulse signal (refer to the signal 47) of a portion exceeding a threshold signal (refer to the signal 45 in FIG. 5) at a predetermined level. Reference numeral 56 denotes a monostable multi-vibrator for opening a gate signal (refer to the signal 44) of a predetermined time width which was triggered in response to the first leading edge of the pulse signal. A Tp comparator 57 supplies a zero-cross point of the phase signal (refer to the signal 422) for a period of time during which the gate signal is open to the controller 1 as a detection signal Tp (refer to the signal Tp). In this example, the time until the zero-cross point of the first leading edge of the phase signal is set to the phase delay time tp.

As mentioned above, the controller 1 obtains the vibration transmission time regarding each vibration sensor 6 on the basis of the detection signals Tg and Tp regarding each vibration sensor 6 and calculates each distance.

<Correction Example of Circuit Delay Time>

The count value (vibration transmission time) latched by each of the latches 34a to 34d in the controller 1 mentioned above includes a circuit delay time et and a phase offset time toff. When the vibration is transmitted from the vibrator pen 3 through the vibration transmission plate 8 and vibration sensor 6, the same amount of error is included in the errors which are caused by those times.

Figure 7:
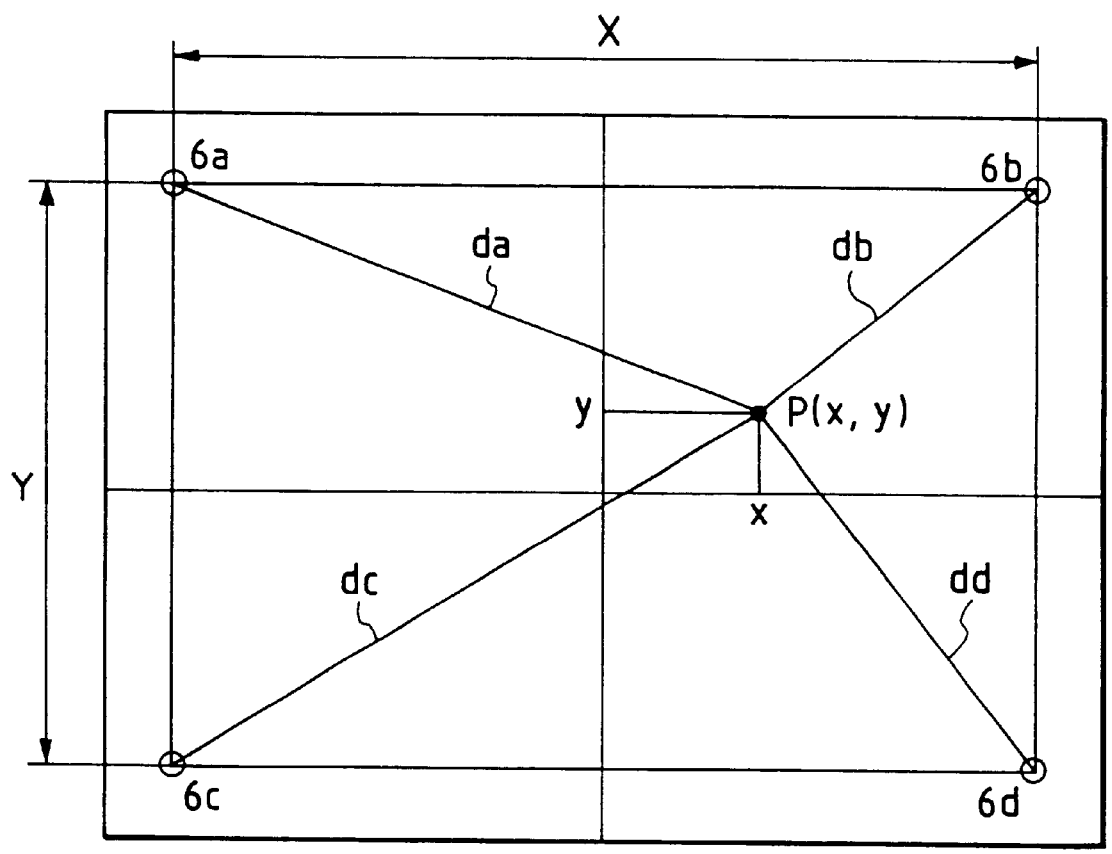
FIG. 7 is a plan view of a vibration transmission plate.

FIG. 7 is a plan view of the vibration transmission plate. In the diagram, the vibration is inputted at an origin O by the vibrator pen 3. Actual measured values of the vibration transmission times (group delay time, phase delay time) from the origin O to the vibration sensor 6a are set to tgz' and tpz'. True vibration transmission times from the origin O to the vibration sensor 6a are set to tgz and tpz. With respect to the circuit delay time et and phase offset time toff, there are the relations of the following equations (4) and (5).

$$tgz'=tgz+et \qquad (4)$$

$$tpz'=tpz+et+toff \qquad (5)$$

With respect to actual measured values tg' and tp' at an arbitrary input point P, there are the relations of the following equations (6) and (7).

$$tg'=tg+et \qquad (6)$$

$$tp'=tp+et+toff \qquad (7)$$

When obtaining differences between the equations (4) and (6) and between the equations (5) and (7), there are the relations of the following equations (8) and (9).

$$\begin{aligned} tg' - tgz' &= (tg + et) - (tgz + et) \\ &= tg - tgz \end{aligned} \qquad (8)$$

$$\begin{aligned} tp' - tpz' &= (tp + et + toff) - (tpz + et + toff) \\ &= tp - tpz \end{aligned} \qquad (9)$$

Namely, the circuit delay time et and phase offset time toff included in each vibration transmission time are removed. A difference between the true transmission delay times from the position of the origin O to the input point P while setting the position of the vibration sensor 6a to a start point can be obtained. Thus, the difference between the distances can be obtained from the equations (2) and (3).

Since the distance from the vibration sensor 6a to the origin O has previously been stored in the non-volatile memory or the like and has already been known, the distance between the vibrator pen 3 and vibration sensor 6a can be determined. With regard to the other sensors 6b to 6d, the distances can be also similarly obtained.

The actual measured values tgz' and tpz' at the origin O are preliminarily stored in the foregoing non-volatile memory at the time of shipping. By executing the calculations by the equations (8) and (9) prior to the calculations of the equations (2) and (3), the measurement can be performed at a high precision.

<Calculation Example of Coordinates>

A principle of calculating the coordinates at which the vibration was inputted onto the vibration transmission plate 8 by the vibrator pen 3 will now be described with reference to FIG. 7. A calculating equation of the coordinates is derived by a theorem of three squares.

In the construction shown in FIG. 7, distances da, db, and dc from the position P(x, y) of the vibrator pen 3 to the vibration sensors 6a to 6c can be calculated by multiplying the vibration transmission time and the vibration transmission speed which has been preset in the ROM and correcting the resultant values as mentioned above.

After the distances da, db, and dc were calculated, the controller 1 calculates the coordinates P(x, y) at which the vibrator pen 3 is in contact on the basis of each distance by the following equations (10) and (11).

$$x=X/2+(da+db)\cdot(da-db)/2X \qquad (10)$$

$$y=Y/2+(da+dc)\cdot(da-dc)/2Y \qquad (11)$$

where, X: distance between the vibration sensors 6a and 6b

Y: distance between the vibration sensors 6a and 6c

As mentioned above, the position coordinates of the vibrator pen 3 can be detected in a real-time manner. In the example, although the coordinates are calculated by the distances to the three vibration sensors 6a to 6c, the distance to the vibration sensor 6d can be used in order to evaluate a validity of the calculated coordinates or to improve a calculating precision of the coordinates.

Although the above embodiment has been shown and described with respect to the example in which the vibration sensors 6 were arranged at four corners of the vibration transmission plate 8, for example, it is also possible to use a construction such that the vibration sensors are arranged in a cross-shape in the center portion of each side of the effective area A. It is sufficient to use an arrangement such that one vibration transmission time can be used as a constant with respect to the vibration sensors arranged at opposite positions.

<Constructional Example of Coordinates Input Portion>

As mentioned above, the coordinates input portion according to the embodiment has a construction such that the resin sheet 12 is fixed to the vibration transmission plate 8 through the adhesive layer 13 and the gap is formed between the resin sheet and the vibration transmission plate 8. The adhesive layer 13 is located on the outside of the fixing position of each vibration sensor 6.

Figure 8:
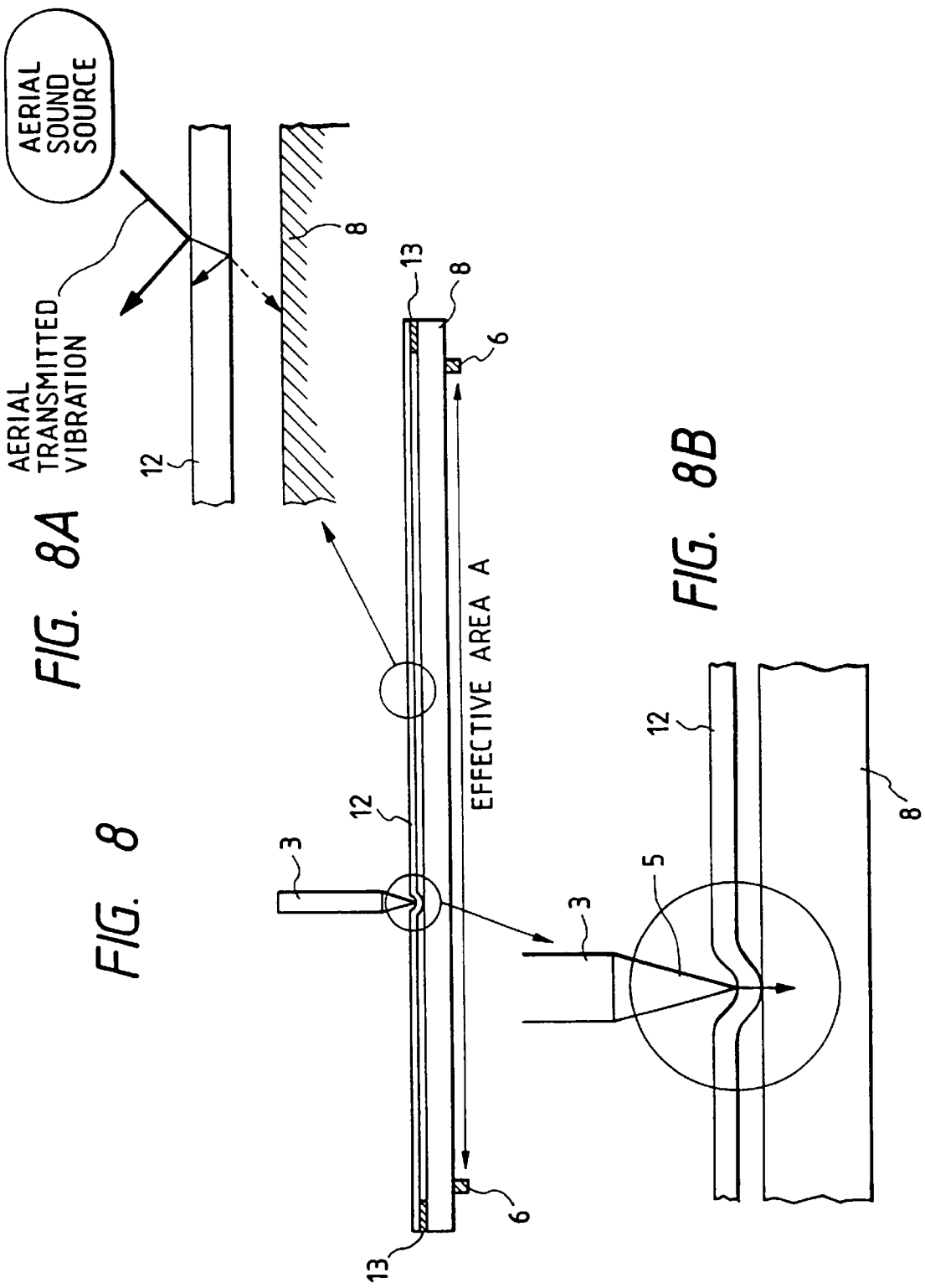

FIGS. 8, 8A and 8B are cross sectional views for explaining a construction and functions of the coordinates input portion in the embodiment. In the construction in which the gap is formed between the resin sheet 12 and vibration transmission plate 8 as shown in the diagram, even in the case where the aerial transmitted vibration includes a frequency that is used in the detection of the vibration and is a continuous sound of a large sound pressure, as shown in the diagram, most of the aerial transmitted vibration is reflected by the surface of the resin sheet 12 due to the difference of the acoustic impedances. Since the gap exists between the resin sheet 12 and vibration transmission plate 8 and the difference between the acoustic impedances of the solid and the gas is large, the incident aerial transmitted vibration is reflected at the boundary with the air layer on the back side of the resin sheet 12 and is also reflected by the surface of the vibration transmission plate 8. Namely, most of the aerial transmitted vibration is shut off by the resin sheet 12 arranged with the gap.

When coordinates are inputted by the vibrator pen 3, namely, when a vibration is inputted, the resin sheet 12 is warped by a writing pressure that is applied to the pen tip 5 and is come into contact with the vibration transmission plate 8. A difference between acoustic impedances of the resin sheet 12 and vibration transmission plate 8 is smaller than a difference between acoustic impedances of a solid and gas. The vibration applied by the vibrator pen 3 is inputted to the vibration transmission plate 8 through a contact portion between the resin sheet 12 and vibration transmission plate 8.

In the embodiment, the resin sheet is used as a plate member that is arranged so as to have a gap between the resin sheet and the vibration transmission plate 8. This is because the position of the resin sheet with which the vibrator pen 3 was come into contact is locally deformed and has an elasticity of a degree such as to come into contact with the vibration transmission plate 8. Therefore, as a material of the resin sheet, it is sufficient to use a material having an elasticity of a degree such that it can be come into contact with the vibration transmission plate 8 by a deformation. For example, PET, polycarbonate, or the like is preferable. It is also possible to print on the surface of the resin sheet or to execute a surface process such as hard coating process, non-glaring process, or the like. Further, it is not always necessary to use the transparent resin sheet for the purpose of an elimination of noise.

The resin sheet has conventionally been used as a vibration transmission plate because it has a nature such that it propagates a vibration. However, since an attenuation ratio of a vibration is larger than that of a metal plate or a glass plate, an influence which is exerted by a phenomenon such that the aerial transmitted vibration entering the resin sheet 12 is transmitted in the resin sheet 12 and is propagated to the vibration transmission plate 8 through the contact portion with the vibration transmission plate 8 or the adhesive layer 13 by the writing pressure is small.

When the vibration transmission plate 8 is made of a metal plate, a glass plate, or the like, since a vibration transmission speed of the resin sheet 12 is slower than that of the vibration transmission plate 8, the vibration which was inputted by the vibrator pen 3 to the resin sheet 12 and reaches each vibration sensor 6 through the resin sheet 12 and adhesive layer 13 is slower than the vibration which reaches each vibration sensor 6 through the contact portion of the vibration transmission plate 8 or the adhesive layer 13 and through the vibration transmission plate 8 by the writing pressure. An influence by the vibration which propagates in the resin sheet 12 can be ignored.

As mentioned above, by the construction such that the resin sheet 12 is arranged so as to have the gap between the sheet and the vibration transmission plate 8, the influence by the aerial transmitted vibration can be effectively shut off and an effect to reduce the influence by noise is large.

It is preferable that the position of the adhesive layer 13 to support the resin sheet is located on the outside of the effective area A to input coordinates and, more preferably, it is on the outside of the fixing position of each vibration sensor 6 as shown in the diagram. This is because since the distance at which the vibration propagates in the resin sheet 12 is long, the effect to attenuate the vibration which is transmitted through the resin sheet 12 is large, and an effect such that the vibration which was inputted by the vibrator pen 3 and is transmitted through the resin sheet 12 is delayed more than the vibration which is transmitted in the vibration transmission plate 8 is large.

The adhesive layer 13 is a member for fixing the resin sheet 12 to the vibration transmission plate 8 so as to have a gap between them as mentioned above and also includes a solidifying layer formed by coating an adhesive agent or a portion which is adhered by a both-sided adhesive tape, an adhesive agent, or the like in dependence on the embodiment. It is desirable to form the adhesive layer 13 by a damping material so as not to transmit the vibration of the resin sheet 12 to the vibration transmission plate 8.

<Supporting Example of Resin Sheet>

Figure 13:
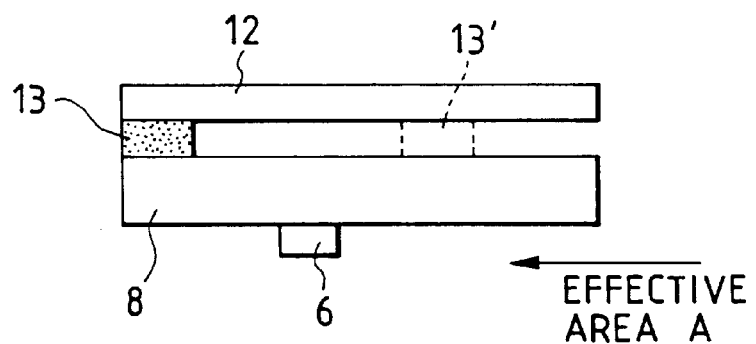
FIG. 13 is a cross sectional view showing an example of a support of a resin sheet.

The resin sheet 12 can be supported by the adhesive layer 13 as mentioned above. In case of supporting the resin sheet 12 by the adhesive layer, it is desirable to arrange the adhesive layer on the outside of the effective area A like an adhesive layer 13' shown in FIG. 13. As mentioned above, it is further preferable to arrange the adhesive layer on the outside of the fixing position of the vibration sensor 6 like the adhesive layer 13 shown in FIG. 13. However, the structure shown is nothing but one embodiment of the invention and, for instance, the following construction can be also used.

Figure 14:
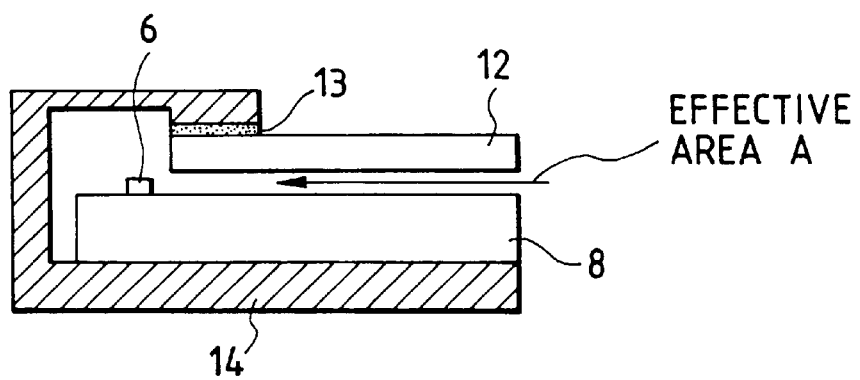
FIG. 14 is a cross sectional view showing another example of a support of the resin sheet.
Figure 15:
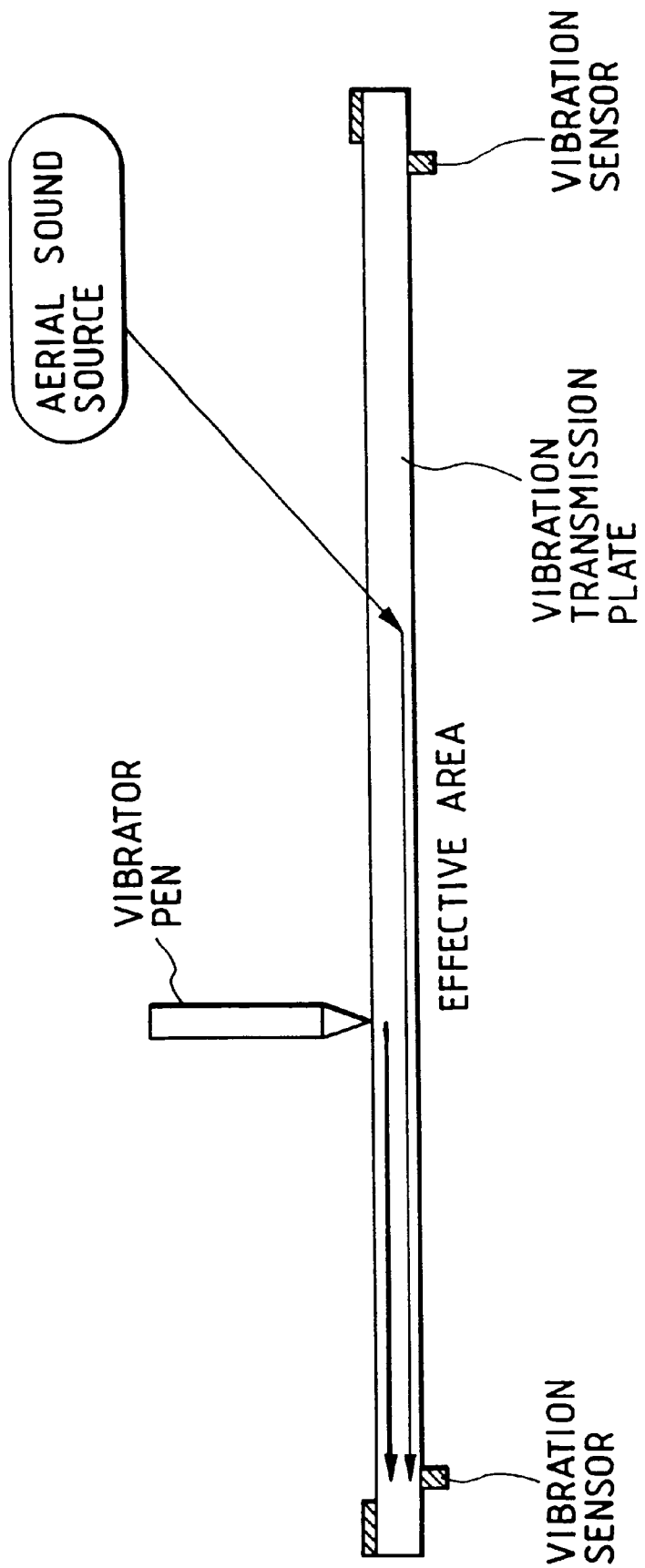
FIG. 15 is a cross sectional view showing a construction of a conventional coordinates input apparatus.

FIG. 14 is a cross sectional view showing another construction to support the resin sheet 12. In the example shown in the diagram, the resin sheet 12 is fixed to a case member 14 through the adhesive layer 13. By fixing the resin sheet 12 to the case member 14 as mentioned above, the aerial transmitted vibration entering the resin sheet 12 is attenuated in the adhesive layer 13 and case member 14. Further, since the vibration transmission plate 8 is supported so as not to be influenced from the case member 14, a phenomenon such that the aerial transmitted vibration entering the resin sheet 12 is transmitted to the vibration transmission plate 8 is efficiently shut off.

According to the embodiment as mentioned above, by arranging the resin sheet over the vibration transmission plate so as to have a gap thereon, the erroneous detection of the coordinates or detection error by the aerial transmitted vibration can be reduced.

Application Example 1 of the Embodiment

In the ordinary embodiment, the coordinates input surface side of the vibration transmission plate 8 faces the outside of the apparatus and the other surface faces the main body side of the coordinates input apparatus. However, when both surfaces of the vibration transmission plate 8 face the outside of the apparatus and are influenced by the aerial transmitted vibration by the aerial sound source, it is desirable to use a structure such that the resin sheets 12 are provided for both surfaces of the vibration transmission plate 8.

Figure 9:
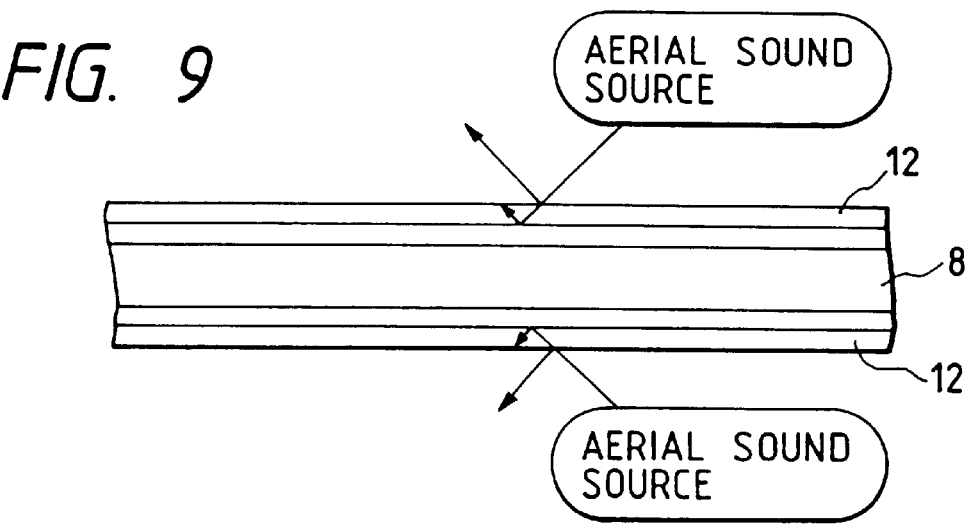
FIG. 9 is a cross sectional view showing a construction of a coordinates input portion according to the first application example.

FIG. 9 is a cross sectional view showing a construction of a coordinates input portion according to the first application example. By arranging the resin sheets 12 on both surfaces of the vibration transmission plate 8 through gaps as shown in the construction of the diagram, influences by aerial transmitted vibrations entering from both surfaces of the vibration transmission plate 8 can be reduced.

Application Example 2 of the Embodiment

Figure 10:
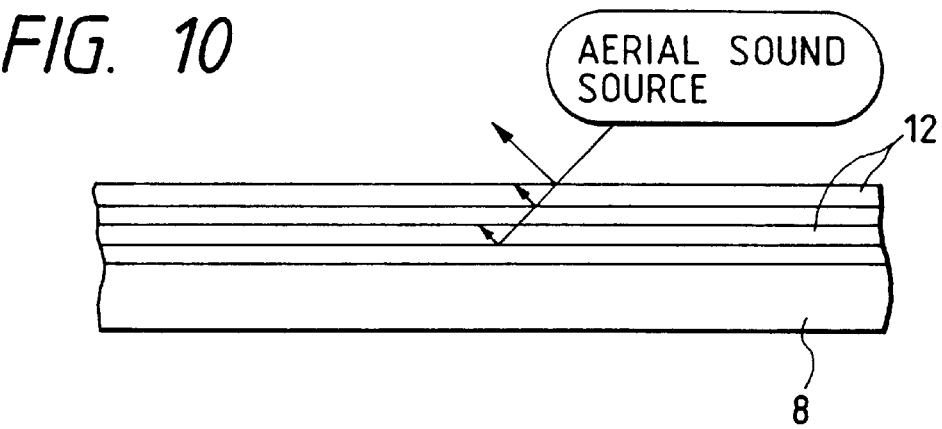
FIG. 10 is a cross sectional view showing a construction of a coordinates input portion according to the second application example.

The application example 2 intends to further reduce the influence by the aerial transmitted vibration by providing a plurality of resin sheets. FIG. 10 is a cross sectional view showing a construction of a coordinates input portion according to the application example 2. The construction shown in the diagram relates to an example in which two resin sheets 12 are arranged so as to have gaps and the aerial transmitted vibration is reflected by the existence of two gaps. However, when the number of resin sheets 12 is thoughtlessly increased, an inputting efficiency of the vibration by the vibrator pen 3 deteriorates, so that it is difficult to detect a necessary vibration. Therefore, it is necessary to determine such a construction by integratedly judging thicknesses of resin sheet and gap, an elasticity of resin sheet, detecting ability of the vibration sensor, and the like.

Application Example 3 of the Embodiment

Figure 11:
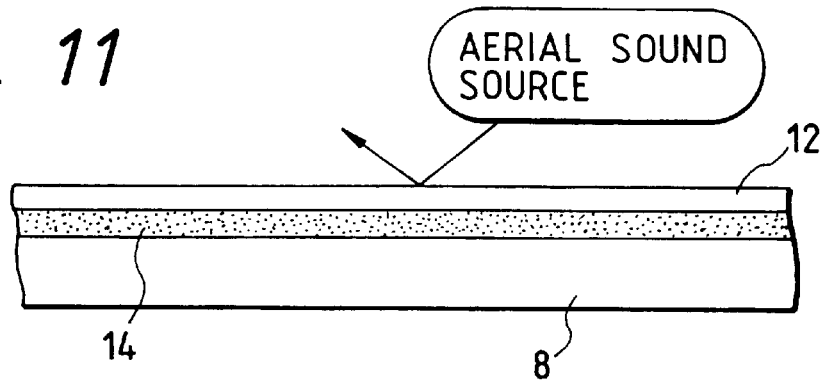
FIG. 11 is a cross sectional view showing a construction of a coordinates input portion according to the third application example.

The application example 3 intends to more stably maintain the gap between the resin sheet 12 and vibration transmission plate 8. FIG. 11 is a cross sectional view showing a construction of a coordinates input portion according to the application example. An air-inclusive material layer 14 containing the air such as porous material, expanded material, or the like is arranged between the resin sheet 12 and vibration transmission plate 8. The air-inclusive material layer 14 has a function to support the resin sheet 12.

Since the air-inclusive material layer 14 has an elasticity, with respect to the input position of the coordinates, it is deformed by the writing pressure and can efficiently transmit the vibration inputted to the resin sheet 12 by the vibrator pen 3 to the vibration transmission plate 8. On the other hand, with respect to the portion other than the input position of the coordinates, the air-inclusive material layer 14 can keep the gap between the resin sheet 12 and vibration transmission plate 8 constant. Therefore, the air-inclusive material layer 14 is deformed by the self-weight of the resin sheet 12 or when the user puts his hand or the like onto the layer 14 (hereinafter, also referred to as a "hand-put") and the resin sheet 12 and vibration transmission plate 8 are acoustically come into contact with each other, so that it is possible to prevent that the aerial transmitted vibration is inputted to the vibration transmission plate 8.

In other words, since the writing pressure to be applied to the pen tip 5 is larger than a pressure by the self-weight of the resin sheet 12, hand-put, or the like, the air-inclusive material layer 14 is deformed by the pen tip 5 and the vibration is easily transmitted to the vibration transmission plate 8. On the other hand, an acoustic impedance of the air-inclusive material layer 14 is remarkably smaller than those of the vibration transmission plate 8 and resin sheet 12 and has an effect such that the aerial transmitted vibration is shut off in a manner similar to the foregoing embodiment.

Application Example 4 of the Embodiment

Figure 12:
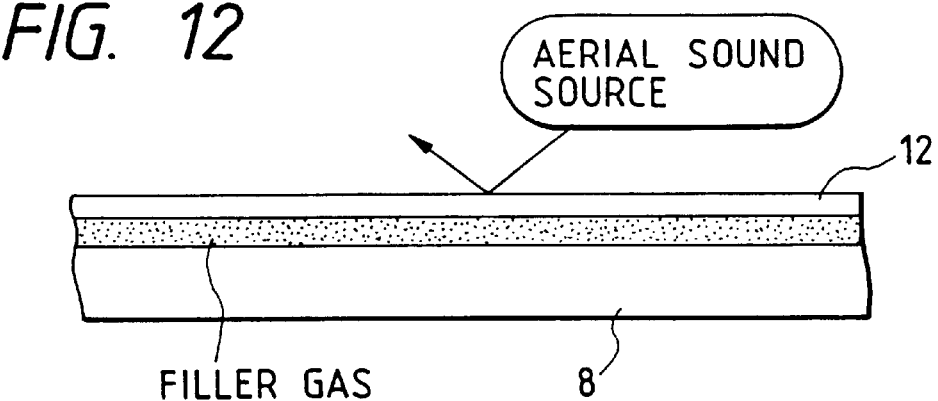
FIG. 12 is a cross sectional view showing a construction of a coordinates input portion according to the fourth application example.

According to the application example 4, in order to stably maintain the gap between the resin sheet 12 and vibration transmission plate 8, gas is filled into the gap between the resin sheet 12 and vibration transmission plate 8. FIG. 12 is a cross sectional view showing a construction of a coordinates input portion according to the application example. The gas is filled between the resin sheet 12 and vibration transmission plate 8 and a pressure in the gap between the resin sheet 12 and vibration transmission plate 8 is maintained at a pressure higher than the atmospheric pressure. Therefore, a phenomenon such that the resin sheet 12 is come into contact with the vibration transmission plate 8 due to the self-weight of the resin sheet 12, hand-put, or the like is suppressed and the influence by the aerial transmitted vibration can be effectively shut off. It will be obviously understood to use a structure such that an airtightness can be maintained by the foregoing adhesive layer 13, case member 14, or the like so as not to leak the gas filled in the gap between the resin sheet 12 and vibration transmission plate 8.

The invention can be applied to a system constructed by a plurality of equipment or can be also applied to an apparatus comprising one equipment.

According to the invention as described above, there are effects such that the influence by the vibration from the outside can be effectively shut off and the erroneous detection or the detection error of the input coordinates can be reduced.

What is claimed is:

1. A coordinates input apparatus, comprising:
    a vibration transmission plate having a coordinate input effective area in which a vibration can be applied by vibration input means and including a plurality of vibration sensors arranged for detecting the vibrations, the vibration transmission plate deriving a coordinate at which a vibration is applied by the vibration input means, on the basis of a transmission time of the applied vibration;
    a resin sheet, having an elasticity and an acoustic impedance higher than an impedance of air, for applying a vibration to said vibration transmission plate by contacting said resin sheet with the vibration input means and shutting off an aerial transmittal vibration; and
    supporting means for supporting the resin sheet at a periphery surrounding the coordinate input effective area,
    wherein the resin sheet is disposed over an entire area of the coordinate input effective area of the vibration transmission plate by said supporting means and having a gap with a small aerial transmittal impedance between the resin sheet and the vibration transmission plate.

2. An apparatus according to claim 1, wherein said supporting means supports said resin sheet to an input surface side of the coordinates of said vibration transmission plate.

3. An apparatus according to claim 2, wherein as for a gap between said vibration transmission plate and said resin sheet, a portion where a writing pressure was applied to said resin sheet by using the vibration input means is deformed, and the vibration is applied to said vibration transmission plate through said portion of said resin sheet deformed by the vibration input means corresponding to a distance where said deformed portion can come into contact with said vibration transmission plate.

4. An apparatus according to claim 3, wherein said supporting means has a porous member for maintaining the gap between said vibration transmission plate and said resin sheet.

5. An apparatus according to claim 3, wherein said supporting means maintains the gap by a pressure of gas filled in the gap between said vibration transmission plate and said resin sheet.

6. An apparatus according to claim 1, wherein said vibration transmission plate is made of a metal material.

7. An apparatus according to claim 2, wherein said vibration transmission plate is made of a metal material.

8. An apparatus according to claim 3, wherein said vibration transmission plate is made of a metal material.

9. An apparatus according to claim 4, wherein said vibration transmission plate is made of a metal material.

10. An apparatus according to claim 5, wherein said vibration transmission plate is made of a metal material.

11. An apparatus according to claim 1, wherein said at least one resin sheet comprises plural resin sheets and said supporting means supports said plate members on both of an input surface side and its back surface side of the coordinates of said vibration transmission plate.

12. An apparatus according to claim 1, wherein said at least one resin sheet comprises a plurality of resin sheets and said supporting means supports the plurality of said resin sheets so as to have gaps among them.

13. An apparatus according to claim 1, wherein the gap between said resin sheet and said vibration transmission plate is filled with gas.

14. An apparatus according to claim 13, wherein the gas is air.

* * * * *

UNITED STATES PATENT AND TRADEMARK OFFICE
CERTIFICATE OF CORRECTION

PATENT NO. : 6,570,558 B2
DATED : May 27, 2003
INVENTOR(S) : Yuichiro Yoshimura et al.

It is certified that error appears in the above-identified patent and that said Letters Patent is hereby corrected as shown below:

Column 1,
Line 8, "relate s" should read -- relates --.

Column 9,
Line 39, "is come" should read -- comes --.

Signed and Sealed this

Second Day of December, 2003

JAMES E. ROGAN
*Director of the United States Patent and Trademark Office*